Sept. 11, 1951     W. P. WINTERS ET AL     2,567,264
SHIELDING DEVICE FOR WIPER MECHANISMS
Filed May 2, 1949     3 Sheets-Sheet 3
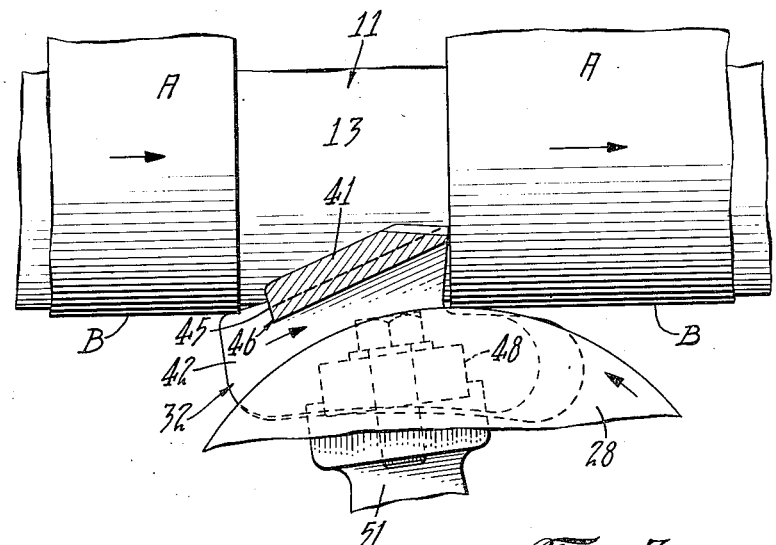
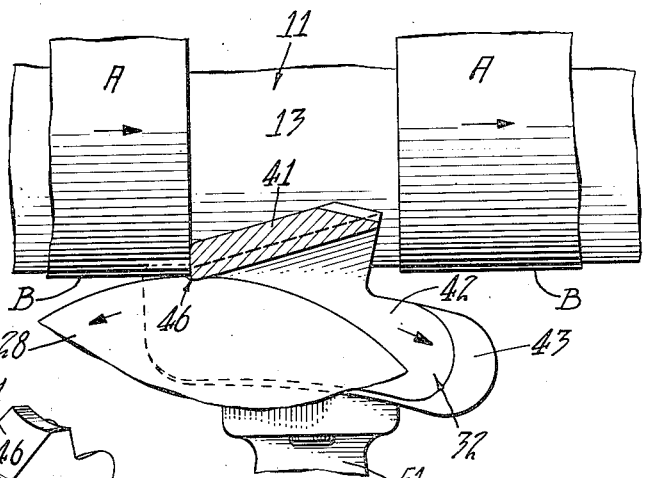
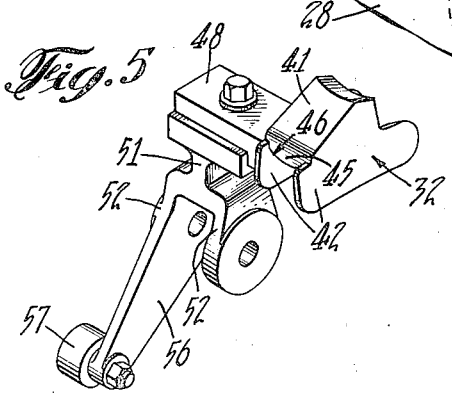
INVENTORS
WILLIAM P. WINTERS
JOHN W. LOCKWOOD
ATTORNEYS Patented Sept. 11, 1951

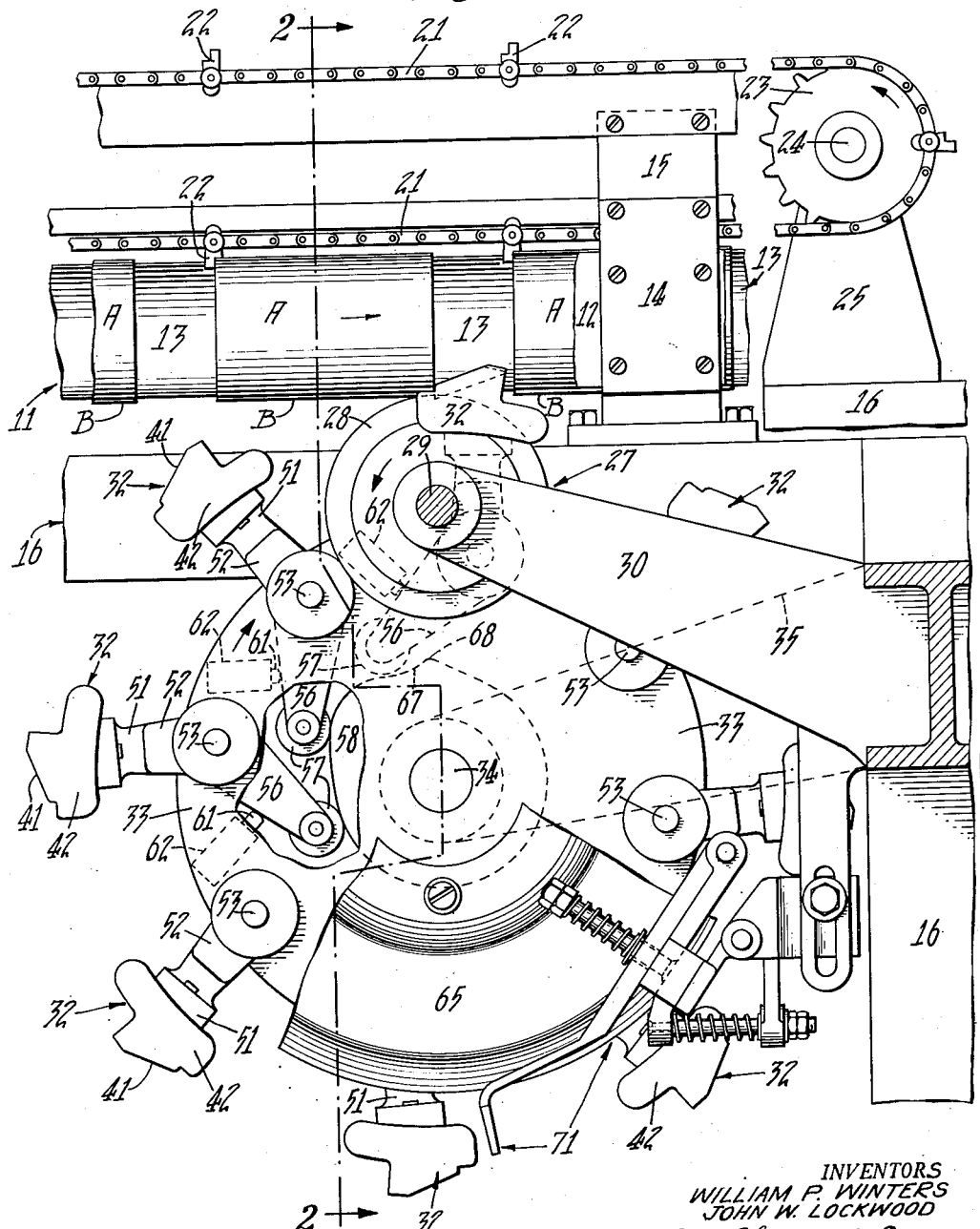

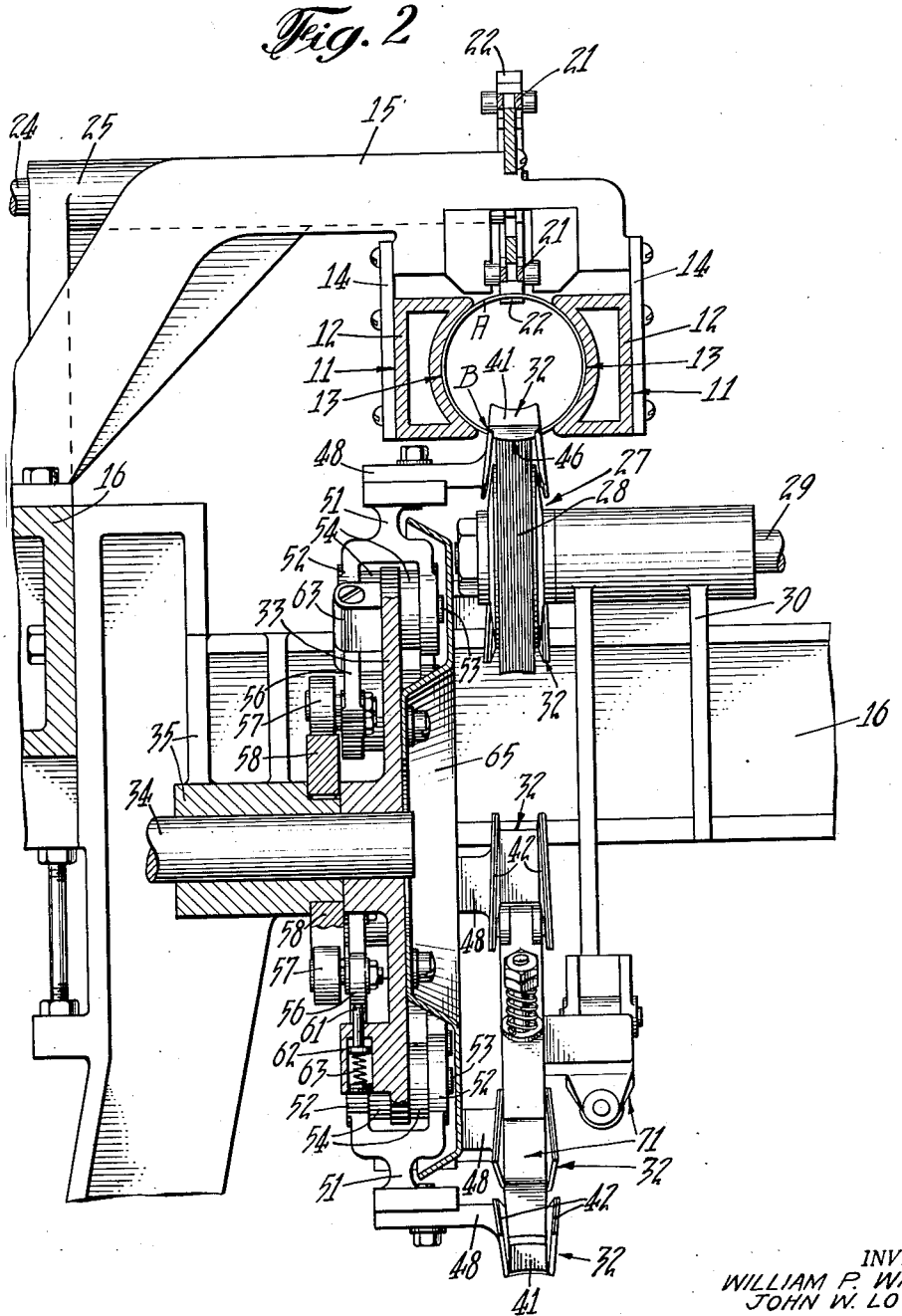

2,567,264

UNITED STATES PATENT OFFICE 2,567,264

SHIELDING DEVICE FOR WIPER MECHANISMS

William P. Winters, Cincinnati, Ohio, and John W. Lockwood, Simcoe, Ontario, Canada, assignors to American Can Company, New York, N. Y., a corporation of New Jersey Application May 2, 1949, Serial No. 90,964

6 Claims. (Cl. 113—97)

The present invention relates to a wiper mechanism for removing excess coating material such as solder from the side seams of can bodies and has particular reference to improved devices for covering or shielding the open end of a can body as well as the wiper during the side seam wiping operation to prevent entrance into the body of coating pellets or other foreign matter which may be thrown off by the wiper, the devices also guarding the forward edge of the body against digging into the wiper, and thereby preventing the spattering of coating material from the wiper. This is an improvement on the solder wiper mechanism disclosed in United States Patent 2,161,839 issued June 13, 1939 to C. S. Woolford on Solder Wiper.

An object of the invention is the provision of a shielding device for a wiper mechanism for removing excess coating material from can body side seams wherein a shielding element is interposable into the path of travel of a moving can body and is movable independently and under controlled action relative to the open end of the can body for covering the wiper and for close fitting engagement with the edge of the body for shielding the interior of the body against the entrance of coating pellets or other foreign matter which may be thrown off by the wiper during the body side seam wiping operation.

Another object is the provision of such a shielding device wherein the shielding element is interposable between can bodies moving in a continuous procession and is shiftable between the leading open end of a can body approaching a wiper and the trailing open end of a can body leaving the wiper for shielding the interiors of both can bodies against the entrance of coating pellets or other foreign matter which may be thrown off by the wiper during the body side seam wiping operation.

Another object is the provision of such a shielding device wherein the shielding element for a portion of its cycle of operation is controlled solely by pressure instrumentalities which insure firm and close engagement of the shielding element with an edge of the can body for the seam wiping operation.

Another object is the provision of such a device for a wiper mechanism wherein the shielding element upon engagement with the leading edge of a can body to be wiped, projects slightly below the normal line of travel of the side seam of the body to protect the leading edge of the side seam of "peaked" or out-of-round bodies as well as normally round bodies, thereby permitting maximum wiping of the side seam while preventing the leading edge of all bodies from digging into the wiper and preventing spattering of coating pellets into the bodies.

Numerous other objects and advantages of the invention will be apparent as it is better understood from the following description, which, taken in connection with the accompanying drawings, discloses a preferred embodiment thereof.

Referring to the drawings:

Figure 1 is a side elevation of the wiper section of a coating machine embodying the instant invention, with parts broken away and parts shown in section;

Fig. 2 is a transverse section taken substantially along the broken line 2—2 in Fig. 1, with parts broken away;

Figs. 3 and 4 are enlarged elevational details illustrating different positions of certain of the parts of the wiper mechanism incidental to shielding the interior surfaces of a moving can body against the entrance of coating pellets and other foreign matter, with parts broken away and parts shown in section; and Fig. 5 is a perspective view of one of the shields and its mounting.

As a preferred or exemplary embodiment of the instant invention the drawings illustrate principal parts of the wiper section of a can body side seam coating machine such as a soldering machine of the general character disclosed in the above mentioned Woolford patent. In such a machine, open end can bodies A having longitudinal side seams B freshly coated with molten solder applied to the outside of the seam, are conveyed in spaced and timed relation in a continuous procession along a straight line path of travel extending longitudinally of the machine past a solder wiper where excess solder on the seams is wiped off.

During the passage of the bodies A through the machine they travel along and are supported by an outside horn 11 (Figs. 1 and 2) which comprises a pair of spaced and parallel hollow guide bars 12 having curved inner faces 13 which support the can bodies and at the same time maintain them in a rounded condition. The horn bars 12 are secured to a plurality of side plates 14 which are spaced at intervals along and which are bolted to overhanging brackets 15 mounted on a main frame 16 of the soldering machine.

The bodies are propelled along the horn 11 in their spaced and timed relation in the direction indicated by the arrow (Fig. 1) by an endless chain conveyor 21 (Figs. 1 and 2) having feed dogs 22 secured thereto at spaced intervals for propelling engagement with the rear edge of the bodies. The conveyor extends the full length of the machine and is operated continuously in any suitable manner. At the wiper end of the machine, the conveyor operates over an idler sprocket 23 (Fig. 1) mounted on a shaft 24 journaled in a bearing bracket 25 bolted to the main frame 16.

The excess solder is removed from the side seams B of the spaced and moving can bodies A by a solder wiper 27 (Figs. 1 and 2) which comprises a rotating wiper wheel 28 preferably constructed of cloth, fibre, bristles or other suitable wiping material. This wiper wheel is mounted on one end of a shaft 29 which is journaled in a bearing bracket 30 bolted to the main frame 16. The wheel is rotated rapidly in any suitable manner in a direction opposite to that of the travel of the bodies along the horn 11 as indicated by the arrow drawn on the wheel 28 (Fig. 1).

When a can body A moves past the wiper 27 the outer periphery of the wiper wheel 28 engages against the body side seam B and wipes away any loose or soft solder adhering thereto. It is this solder which may be thrown or catapulted off the rapidly turning wheel 28, especially when the wheel becomes loaded, and such catapulted solder may enter the interior of the bodies and thus contaminate the bodies if no protection is provided.

In the instant invention the thrown solder or other foreign matter is prevented from entering the can bodies A by a movable shield 32 (see also Figs. 3, 4 and 5) which is pivotally mounted to a rotatable carrier member or disc 33 (Figs. 1 and 2) disposed in a vertical plane parallel with and adjacent the wiper wheel 28. The disc is mounted on a rotatable shaft 34 journaled in a bearing bracket 35 secured to the main frame 16. The shaft is rotated in any suitable manner in time with and in the same direction of travel (as indicated by the arrow in Fig. 1) as the can bodies A moving along the horn 11.

There are a plurality of the shields 32 arranged around the outer periphery of the disc 33 and they are interposable into the spaces between the moving can bodies A while simultaneously covering the wiper wheel 28 as the disc rotates. Each shield 32 comprises a top bridge member 41 (Figs. 3, 4 and 5) having a pair of depending spaced side wings 42 formed integrally therewith. The bridge member 41 when brought into shielding position extends into the space between the bodies while the wings 42 extend down adjacent the sides of the wiper wheel 28 thereby covering it at top and sides. The leading ends of the wings 42 (at the right as viewed in Figs. 3 and 4) are formed with inwardly tapered faces 43 to facilitate entrance of the wiper wheel between the wings.

The bridge member 41 preferably is inclined toward its forward end (the right as viewed in Figs. 3, 4 and 5) to catch solder pellets or other foreign matter thrown from the wiper wheel 28 and to deflect them back onto the wheel. The rear or trailing end of the bridge member 41 is formed with a substantially flat and relatively deep wall section 45 (Fig. 5) which is shaped at its lower edge to correspond to the curvature of the can body A and which is adapted to engage against the leading edge of the can body adjacent its side seam B during the seam wiping operation. The lower curved edge, marked 46, of this wall section 45 is curved and extends a slight distance below the path of travel of the side seam of a normal or truly round can body A so as to insure full engagement with a leading body edge which may be slightly out-of-round or may be "peaked" at the side seam.

One of the wings 42 of each of the shields 32 is formed integrally with a support bar 48 which extends laterally from the wing. These support bars 48 are bolted to the outer ends of bifurcated actuating, rocker or control levers 51 (Figs. 2 and 5) which are pivotally mounted on the disc 33. For this purpose the levers are formed with a pair of spaced and parallel legs 52 which straddle the outer periphery of the disc 33 and which are mounted on pivot pins 53 carried in bosses 54 extending outwardly from both sides of the disc (Fig. 2). One of the legs 52 of each lever 51 is formed with an extension or actuating arm 56 (see Figs. 1, 2 and 5) which projects inwardly toward the disc shaft 34. The inner ends of these arms 56 carry cam rollers 57 and operate as cam followers against a stationary edge cam 58 disposed adjacent the disc 33 and mounted on and keyed to the adjacent bearing of the bearing bracket 35.

The cam rollers 57 are urged against the cam 58 by spring plungers 61 (Figs. 1 and 2) which engage against the actuating arms 56. These spring plungers are slidably carried in spring barrels 62 containing compression springs 63 which press against the spring plungers and force them against the actuating arms 56. A guard plate 65 (Figs. 1 and 2) secured to the outer face of the disc 33 and extending outwardly around the pivotal mountings of the shields 32 is interposed between these parts and the wiper wheel 28 and thus protects the movable parts of the shields against spattering solder or other foreign matter thrown off by the wheel.

In operation, the shields 32 travel around a curved or circular path of travel with the rotating disc 33 and are individually interposed into the spaces between the can bodies A as they advance in a continuous procession past the wiper device 27. A shield 32 enters a space between two adjacent can bodies by virtue of the disc 33 carrying the shield and its pivotal mounting upwardly to the top of its path of rotation as viewed in Fig. 4. At this peak position of the shield, a can body A is in contact with the wiper wheel 28 and is just leaving the wheel while the next following can body in the procession is approaching the wheel, in the directions indicated in Fig. 4.

Simultaneously with this movement of a shield 32 up into the space between the two can bodies, its actuating lever 51 is rocked forward by the cam 58 as the cam roller 57 traverses the cam edge, and this forward movement of the lever advances the shield 32 into position adjacent the trailing edge of the can body which is leaving the wiper wheel 28 as best shown in Fig. 4. With the shield in this posiiton its bridge member 41 is disposed at an angle between the departing and the approaching can bodies, with the lower end of the bridge member slightly below and spaced away from the side seam edge of the approaching body A. Hence any solder pellets or other foreign matter which is thrown off the wiper wheel 28 or is spattered by the trailing edge of the departing can body as it leaves the wiper, is caught by the low portion of the inclined bridge member of the shield and is deflected back to the wheel. In this manner the solder pellets or other foreign matter are prevented from entering the trailing end of the departing can body as well as the leading end of the approaching can body.

As both bodies continue to advance, the departing body, whose side seam by now has been fully wiped, moves clear of the wiper wheel 28 and as the approaching body comes near the wiper wheel, the cam 58 by means of a depressed or clearance section 67 (Fig. 1) in its contour, permits the roller 57 to ride off the cam, and thereby releases its control of the shield. The compression spring 63 acting through the spring plunger 61 in the adjacent spring barrel 62 immediately rocks the actuating lever 51 and the shield carried thereon, in a rearward direction, away from the wiped and departing can body A and into engagement with the leading edge of the approaching can body, as best shown in Fig. 3, to prevent the spattering of solder pellets or other foreign matter into the interior of the approaching can body. Thus by means of the clearance section 67 in the cam 58, the shield 32 is free to move rearwardly as far as the spring plunger 61 can force it independently of the cam and hence a tight, close engagement between the shield and the edge of the can body adjacent the side seam is always insured irrespective of any slight variation in the distance between the adjacent can bodies.

In this engagement of the shield 32 with the approaching can body A, the lower edge 46 of the rear curved wall section 45 of the shield extends slightly below the leading relatively sharp edge of the approaching can body A and thus prevents this leading edge from digging into the wiper wheel 28 as well as fully protecting the interior of the can body from solder pellets or other foreign matter thrown off by the wheel as the side seam of the approaching can body comes into engagement with the wiper wheel for the wiping operation. The lower edge 46 of the shield in no way interferes with the side seam nor with the wiper wheel and thereby permits a maximum wiping action, i. e. a wiping action against the seam for its full length excepting an infinitesimally short section immediately adjacent the edge 46 of the shield.

As the can body now being wiped continues its advancement in contact with the wiper wheel, the shield advances with the body by virtue of the rotation of the disc 33, until its leading end is past the point where matter from the wiper wheel could be thrown into the body and at this point the cam 58, through a raised or projecting section 68 (Fig. 1) on its contour, takes over control of the actuating lever 51. As the cam roller 57 engages this raised section 68 of the cam, it rocks the actuating lever 51 through a slight forward movement which eases the shield 32 away from the leading edge of the can body just prior to the shield being withdrawn from the space between the bodies as the shield rotates with the disc 33 in a downward direction away from the path of travel of the can bodies. This completes a full cycle of operation of the shielding device.

Any solder that may cling to the inclined inner face of the bridge members 41 of the shields 32 after passing through a can body shielding operation is scraped off as the shields pass down under the disc 33, by a scraper device 71 of conventional construction and fully disclosed and explained in the above mentioned Woolford patent.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A wiping mechanism for removing excess coating material such as solder from the side seams of can bodies or the like, comprising feeding devices for advancing can bodies having freshly coated side seams with said side seams progressing in spaced relation and longitudinal alignment along a predetermined path of travel, a wiper located adjacent said path of travel and having engagement along the coated side seams of said passing can bodies during their advancement for wiping said side seams, shielding means for shielding the interiors of the bodies against the entrance of coating material and other foreign matter thrown from said wiper, advancing means synchronized with said feeding means for interposing said shielding means into the space between two moving consecutive can bodies, and means comprising yieldable control devices coacting with said interposing means in timed relation with said feeding devices for shifting said interposed shielding means first forwardly into position adjacent the end edge of a can body departing from said wiper and then rearwardly into yieldable engagement with the end edge of a can body approaching said wiper, without overlapping the seam surface to be wiped, for shielding both bodies.

2. A wiping mechanism for removing excess coating material such as solder from the side seams of spaced moving can bodies or the like, comprising feeding devices for advancing can bodies having freshly coated side seams with said side seams progressing in spaced relation and longitudinal alignment along a predetermined path of travel, a wiper located adjacent said path of travel and having engagement along the coated side seams of said passing can bodies during their advancement for wiping said side seams, shielding means for shielding the interiors of the bodies against the entrance of coating material and other foreign matter thrown from said wiper, said shielding means having a substantially flat rear wall section, advancing means synchronized with said feeding means for interposing said shielding means into the space between two moving can bodies and for advancing said shielding means into shielding position close to the edge of a can body departing from said wiper, and resilient pressure means coacting with said interposed shielding means for retracting said shielding means and for yieldably pressing said flat rear wall of said shielding means into engagement with an end edge of a can body approaching said wiper, without overlapping the seam surface to be wiped, for shielding the interior of said approaching body.

3. A wiping mechanism for removing excess coating material such as solder from the side seams of can bodies or the like, comprising feeding devices for advancing can bodies having freshly coated side seams with said side seams progressing in longitudinal alignment along a predetermined path of travel and in spaced relation, a wiper located adjacent said path of travel and having engagement along the coated side seams of said passing can bodies during their advancement for wiping said side seams, a movable carrier member disposed adjacent said path of travel of the can bodies and adjacent said wiper, cam follower means movably mounted on said carrier member, a shield on said cam follower means and interposable into the space between adjacent can bodies, cam means coacting with said carrier member and said cam follower means for advancing said interposed shield into position closely adjacent the trailing edge of a can body departing from said wiper, and yieldable means operable against said cam follower means for shifting said shield away from said departing can body and into contact with the leading edge of the next body approaching the wiper, without overlapping the seam surface to be wiped, said shield thereby shielding the interiors of said departing and approaching can bodies successively against the entrance of coating and other foreign matter thrown from said wiper.

4. A wiping mechanism for removing excess coating material such as solder from the side seams of can bodies or the like, comprising feeding devices for advancing can bodies having freshly coated side seams with said side seams progressing in longitudinal alignment along a predetermined path of travel in a continuous procession and in spaced and timed relation, a wiper located adjacent said path of travel and having engagement along the coated side seams of said passing can bodies during their advancement for wiping said side seams, a carrier member rotatable in time with said feeding devices and disposed adjacent the path of travel of said bodies and adjacent said wiper, a plurality of mountings pivotally carried on and arranged in spaced order around said carrier member, a shield supported on each of said mountings and interposable by said carrier member into the path of travel of said bodies, a stationary cam disposed adjacent said carrier member and controlling the movement of said shield relative to said carrier member and said bodies while said shield is interposed between adjacent can bodies for shifting the shield into shielding position adjacent the trailing end of a departing can body leaving said wiper to protect the interior of said departing body against the entrance of solder and other foreign matter thrown from said wiper, said cam having a clearance section for releasing control of said shield and its mounting as a can body approaches said wiper, and resilient pressure means acting against each of said mountings while said cam control is released for yieldably pressing said shield into close fitting engagement with the leading edge of a can body approaching said wiper, without overlapping the seam surface to be wiped, for shielding said approaching can body against the entrance of coating material and other foreign matter thrown from said wiper.

5. A solder wiping mechanism for soldering machines, comprising feeding devices for advancing can bodies having freshly soldered side seams with said side seams progressing in longitudinal alignment and in spaced relation along a predetermined path of travel, a wiper located adjacent said path of travel and having engagement along the soldered side seams of said passing can bodies during their advancement for wiping said side seams, shielding means movable into the space between two moving can bodies and over said wiper for shielding the interiors of the bodies against the entrance of solder and other foreign matter thrown from said wiper, said shielding means having a substantially flat and relatively deep rear wall section facing the leading edge of a can body approaching said wiper, and means for moving said shielding means in timed relation with said feeding devices to interpose said shielding means between said can bodies and to move said rear wall section under yielding pressure into sealing abutment with said leading edge of a moving can body, said rear wall section extending below said leading edge while it passes over said wiper to insure shielding the interior of the body whether normally rounded or out-of-round and to provide a minimum sealing contact between the can edge and the shielding means.

6. A wiping mechanism for removing excess coating material such as solder from the side seams of can bodies or the like, comprising feeding devices for advancing can bodies having freshly coated side seams with said side seams progressing in longitudinal alignment along a predetermined path of travel in spaced order, a wiper located adjacent said path of travel and having engagement along the coated side seams of said passing can bodies during their advancement for wiping said side seams, a rotatable carrier member disposed adjacent said path of travel of the can bodies and adjacent said wiper, an oscillatable member pivotally mounted on said rotatable carrier member, a shield on a free extremity of said oscillatable member, said shield having a substantially flat rear wall section facing the leading edge of a can body approaching said wiper, means for rotating said carrier member in timed relation to the movement of said feeding devices for interposing said shield between the end edges of the side seams of two of said spaced can bodies, cam means coacting with said carrier means and said oscillatable member for moving said shield relative to said carrier and into position closely adjacent the end edge of the can body departing from said wiper to shield said departing body, and resilient pressure means coacting with said oscillatable member for retracting said shield relative to said carrier and said departing can body and for moving said rear wall section into yieldable sealing engagement with the leading edge of the can body approaching said wiper, without overlapping the seam surface to be wiped, to shield said approaching body.

WILLIAM P. WINTERS.
JOHN W. LOCKWOOD.

REFERENCES CITED

The following references are of record in the file of this patent:

UNITED STATES PATENTS

| Number | Name | Date |
|---|---|---|
| 1,985,906 | Smith | Jan. 1, 1935 |
| 2,161,839 | Woolford | June 13, 1939 |
| 2,460,327 | Woolford | Feb. 1, 1949 |